(12) United States Patent
Yarbrough et al.

(10) Patent No.: US 10,550,823 B2
(45) Date of Patent: Feb. 4, 2020

(54) METHOD FOR BALANCING SEGMENTED WIND TURBINE ROTOR BLADES

(71) Applicant: General Electric Company, Schenectady, NY (US)

(72) Inventors: Aaron A. Yarbrough, Greenville, SC (US); Donald Joseph Kasperski, Simpsonville, SC (US); Daniel Alan Hynum, Simpsonville, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 640 days.

(21) Appl. No.: 15/232,900

(22) Filed: Aug. 10, 2016

(65) Prior Publication Data
US 2018/0045174 A1 Feb. 15, 2018

(51) Int. Cl.
*F03D 13/00* (2016.01)
*F03D 9/25* (2016.01)
*F03D 1/06* (2006.01)

(52) U.S. Cl.
CPC .............. *F03D 9/25* (2016.05); *F03D 1/0675* (2013.01); *F05B 2240/2211* (2013.01); *F05B 2240/302* (2013.01); *F05B 2260/966* (2013.01)

(58) Field of Classification Search
CPC ................ F03D 13/35; F05B 2240/302; F05B 2260/966

(Continued)

(56) References Cited

U.S. PATENT DOCUMENTS 4,078,422 A * 3/1978 Brunsch ................ B64C 27/008
                                                                 416/224
4,789,813 A    12/1988 Orchard
(Continued)

FOREIGN PATENT DOCUMENTS

CA        2394969 A1 *  7/2001  ............. B64C 27/46
CA        2650720 A1 *  7/2010  ............. F03D 1/065
(Continued)

OTHER PUBLICATIONS

Extended European Search Report and Opinion issued in connection with corresponding EP Application No. 17184806.2 dated Jan. 17, 2018.

*Primary Examiner* — Justin D Seabe
*Assistant Examiner* — Brian Christopher Delrue
(74) *Attorney, Agent, or Firm* — Dority & Manning, P.A.

(57) ABSTRACT

A method for balancing segmented rotor blades for a wind turbine may include determining a weight for each of a plurality of blade segments, wherein each blade segment extends between a first end and a second and is configured to form a common spanwise section of a segmented rotor blade between the first and second ends. The method may also include determining an initial static moment for each blade segment based on the weight of the blade segment, wherein the initial static moment of at least one of the blade segments differing from the initial static moments of the remainder of the blade segments. Additionally, the method may include adding mass to each of the blade segments to increase the initial static moment for each blade segment to a predetermined static moment, wherein the predetermined static moment is greater than each of the initial static moments of the blade segments.

17 Claims, 6 Drawing Sheets

(58) Field of Classification Search
USPC .................................................... 416/144
See application file for complete search history.

(56) References Cited

U.S. PATENT DOCUMENTS

| | | | |
|---|---|---|---|
| 6,726,439 B2 | 4/2004 | Mikhail et al. | |
| 2005/0013694 A1 | 1/2005 | Kovalsky et al. | |
| 2007/0253824 A1 | 11/2007 | Eyb | |
| 2009/0304507 A1 | 12/2009 | Dehlsen | |
| 2010/0242598 A1* | 9/2010 | Pedersen | G01M 1/12 73/456 |
| 2010/0264747 A1* | 10/2010 | Hall | B60L 11/182 307/104 |
| 2011/0020126 A1 | 1/2011 | Glenn et al. | |
| 2011/0081248 A1 | 4/2011 | Hibbard | |
| 2012/0100002 A1* | 4/2012 | Kawasetsu | F03D 1/0675 416/229 R |
| 2012/0141287 A1* | 6/2012 | Hynum | F03D 1/0675 416/235 |
| 2012/0294714 A1* | 11/2012 | Friedrich | F03D 7/0228 416/1 |
| 2013/0091705 A1* | 4/2013 | Kyriakides | F03D 13/10 29/889.7 |
| 2013/0219718 A1* | 8/2013 | Busbey | F03D 1/065 29/889.71 |
| 2014/0286780 A1* | 9/2014 | Lemos | F03D 1/0675 416/210 R |
| 2015/0110632 A1* | 4/2015 | Rohden | F03D 1/0675 416/210 R |
| 2015/0132137 A1* | 5/2015 | Humblot | F03D 1/0633 416/212 R |
| 2015/0152839 A1* | 6/2015 | Busbey | F03D 1/0675 416/132 B |
| 2015/0369211 A1* | 12/2015 | Merzhaeuser | F03D 1/0675 416/61 |
| 2017/0067439 A1* | 3/2017 | Yarbrough | F03D 1/0675 |
| 2017/0089323 A1* | 3/2017 | Yarbrough | F03D 1/0675 |
| 2017/0145986 A1* | 5/2017 | Baehmann | F03D 1/0675 |
| 2017/0363063 A1* | 12/2017 | Yarbrough | F03D 1/0675 |
| 2018/0051672 A1* | 2/2018 | Merzhaeuser | F03D 13/10 |
| 2018/0118084 A1* | 5/2018 | Patel | B60P 7/12 |
| 2018/0135728 A1* | 5/2018 | Paulson | B64C 11/008 |
| 2018/0142676 A1* | 5/2018 | Pedersen | F03D 7/0224 |
| 2018/0328334 A1* | 11/2018 | Barber | F03D 1/0625 |
| 2018/0355842 A1* | 12/2018 | Badger | F03D 1/0675 |

FOREIGN PATENT DOCUMENTS

| | | | | |
|---|---|---|---|---|
| CA | 2800555 A1 | * | 12/2011 | ............ F03D 1/0675 |
| CA | 2856165 A1 | * | 6/2013 | ............ F03D 1/0675 |
| CA | 2857991 A1 | * | 6/2013 | ............ F03D 1/0658 |
| CA | 2852334 A1 | * | 11/2014 | ............ B21D 53/78 |
| CA | 2854719 A1 | * | 1/2015 | ............ F03D 1/0658 |
| DE | 102014204017 A1 | * | 9/2015 | ............ F03D 7/0224 |
| EP | 2233904 A1 | * | 9/2010 | ............ G01M 1/12 |
| EP | 3 025 053 A1 | | 6/2016 | |
| EP | 3 034 861 A1 | | 6/2016 | |
| EP | 3034861 A1 | * | 6/2016 | ............ F03D 1/0675 |
| EP | 3282121 A1 | * | 2/2018 | ............ F03D 9/25 |
| WO | WO-2009135902 A2 | * | 11/2009 | ............ F03D 1/0675 |
| WO | WO-2013113603 A1 | * | 8/2013 | ............ F03D 7/0296 |
| WO | WO-2018188820 A1 | * | 10/2018 | ............ G01G 19/18 |

* cited by examiner

METHOD FOR BALANCING SEGMENTED WIND TURBINE ROTOR BLADES

FIELD OF THE INVENTION

The present subject matter relates generally to segmented rotor blades for wind turbines and, more particularly, to a method for balancing segmented rotor blades for use within a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with three rotor blades extending outwardly from the hub. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

When installing rotor blades on a wind turbine, careful attention must be placed to balancing out the rotor blades to ensure that a balanced load is applied to the rotor during operation of the wind turbine. Typically, blade balancing occurs in the field, with each full rotor blade being weighed and balanced relative to the other rotor blades. Unfortunately, the current field-implemented blade balancing process has many disadvantages, including being quite time consuming and cumbersome. In addition, with segmented rotor blades becoming more popular, the disadvantages of the conventional blade balancing process have been exacerbated by the need to balance multiple components for each rotor blade in order to form a fully balanced rotor set.

Accordingly, an improved method for balancing segmented rotor blades of a wind turbine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for balancing segmented rotor blades for a wind turbine. The method may generally include determining a weight for each of a plurality of blade segments, wherein each blade segment extends between a first end and a second and is configured to form a common spanwise section of a segmented rotor blade between the first and second ends. The method may also include determining an initial static moment for each blade segment based on the weight of the blade segment, wherein the initial static moment of at least one of the blade segments differing from the initial static moments of the remainder of the blade segments. Additionally, the method may include adding mass to each of the blade segments to increase the initial static moment for each blade segment to a predetermined static moment, wherein the predetermined static moment is greater than each of the initial static moments of the blade segments.

In another aspect, the present subject matter is directed to a method for balancing segmented rotor blades for a wind turbine. The method may generally include providing a plurality of tip segments and a plurality of root segments, wherein each root segment has a predetermined root static moment and is configured to be coupled to one of the tip segments to form a segmented rotor blade. The method may also include determining a weight of each of the plurality of tip segments and determining an initial tip static moment for each tip segment based on the weight of the tip segment, wherein the initial tip static moment of at least one of the tip segments differs from the initial tip static moments of the remainder of the tip segments. In addition, the method may include adding mass to each of the tip segments to increase the initial tip static moment for each tip segment to a predetermined tip static moment, wherein the predetermined tip static moment is greater than each of the initial tip static moments of the tip segments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
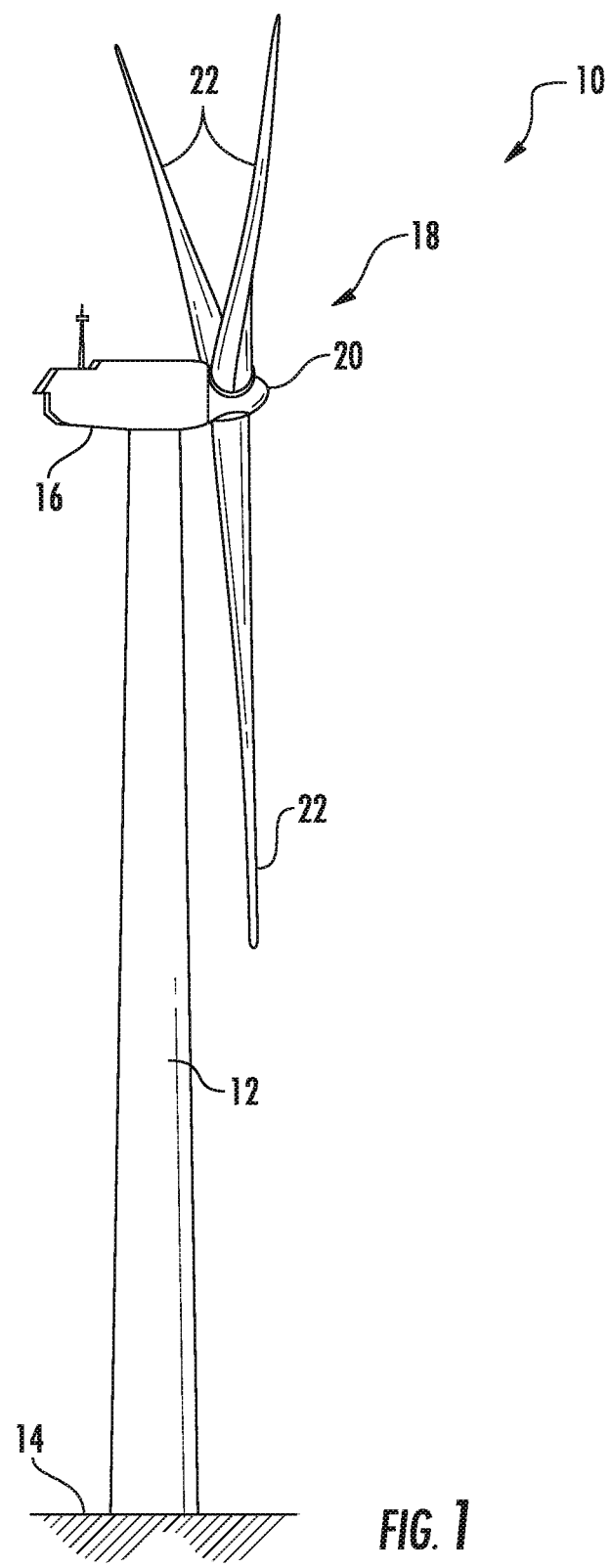
FIG. 1 illustrates a side view of one embodiment of a wind turbine in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

In general, the present subject matter is directed to methods for balancing segmented rotor blades of a wind turbine. Specifically, in several embodiments, the disclosed method provides for sets of blade segments of a given type/model (e.g., tip segments or root segments) to be balanced relative to one another independent of the full rotor blade assembly, which may allow for the blade segments to be balanced in a manufacturing setting (e.g., in a controlled, factory environment) as opposed to in the field. Once balanced, the blade segments may be joined with their corresponding blade segments in the field without requiring the various blade segments to be re-weighed and/or re-balanced. For instance, in one embodiment, a set of tip segments may be balanced relative to one another such that each tip segment defines the same tip static moment while a corresponding set of root segments may be balanced relative to one another such that each root segment defines the same root static moment prior to such blade segments being shipped to the field. Once at the field, the tip and root sections may be joined together without requiring any further weighing or balancing to form a fully balanced rotor set.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
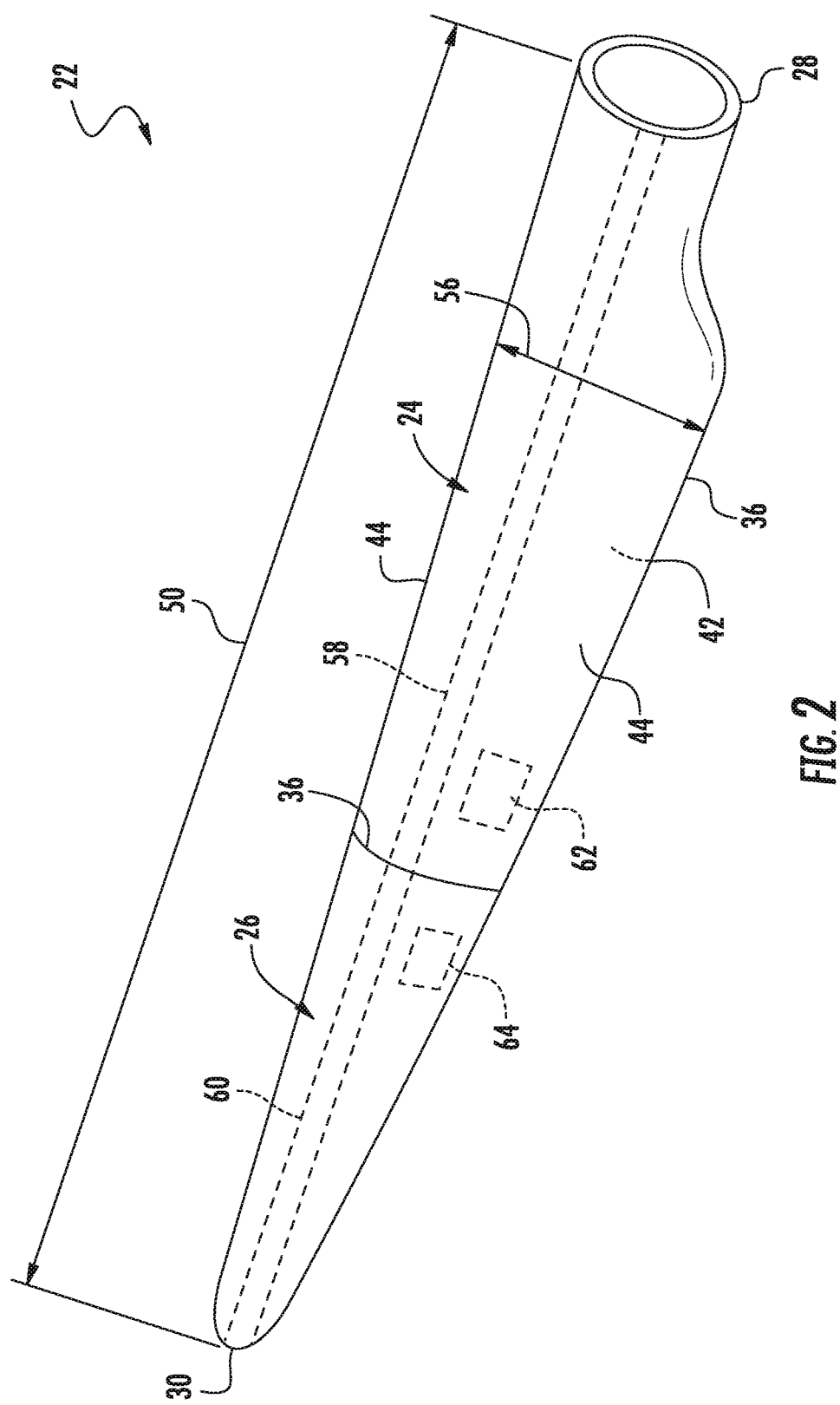
FIG. 2 illustrates a perspective view of one embodiment of a segmented rotor blade suitable for use with the wind turbine shown in FIG. 1 in accordance with aspects of the present subject matter.
Figure 3:
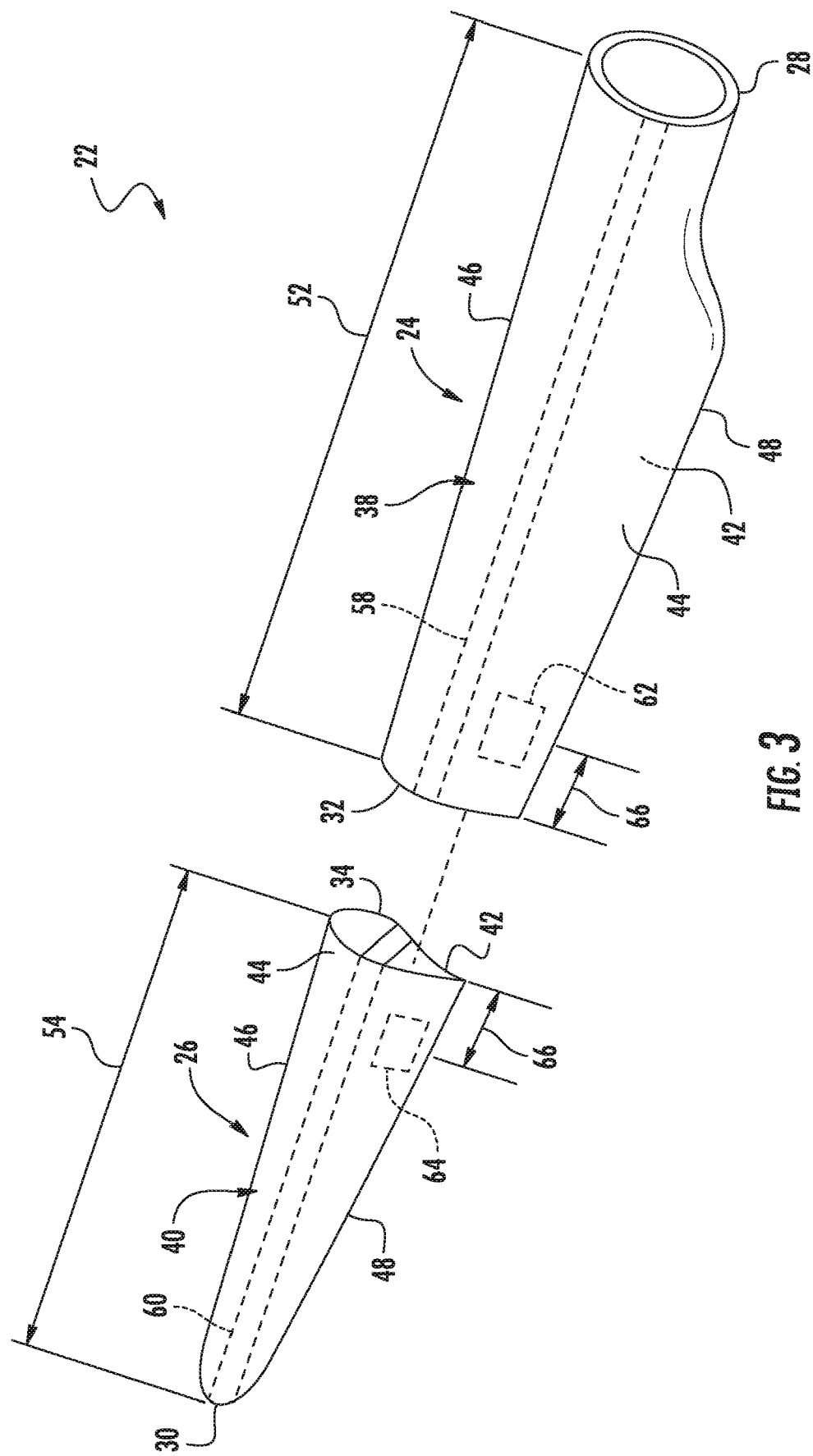
FIG. 3 illustrates an exploded view of the segmented rotor blade shown in FIG. 2, particularly illustrating a root segment of the rotor blade exploded away from a tip segment of the rotor blade.

Referring now to FIGS. 2 and 3, one embodiment of a segmented rotor blade 22 suitable for use with the wind turbine 10 shown in FIG. 1 is illustrated in accordance with aspects of the present subject matter. Specifically, FIG. 2 illustrates a perspective, assembled view of the rotor blade 22 and FIG. 3 illustrates a perspective, exploded view of the rotor blade 22.

As shown, the rotor blade 22 may generally be formed from a plurality of spanwise blade segments 24, 26 configured to be coupled end-to-end such that the rotor blade 22 extends between a blade root or root end 28 configured to be mounted or otherwise secured to the hub 20 (FIG. 1) of the wind turbine 10 and a blade tip or tip end 30 disposed opposite the blade root 28. For example, in the illustrated embodiment, the rotor blade assembly 22 is formed from two blade segments 24, 26, namely a first blade segment 24 (e.g., a root segment) and a second blade segment 26 (e.g., a tip segment). As particularly shown in FIG. 3, the root segment 24 may generally extend lengthwise between the root end 28 and a first joint end 32. Similarly, the tip segment 26 may generally extend lengthwise between the tip end 30 and a second joint end 34. In such an embodiment, the blade segments 24, 26 may generally be configured to be coupled to one another at their joint ends 32, 34. For example, as shown in FIG. 2, when the blade segments 24, 26 are coupled together at their joint ends 32, 34, a blade joint 36 may be defined at the joint interface between the root and tip segments 24, 26.

It should be appreciated that, in other embodiments, the rotor blade 22 may be formed from any other suitable number of spanwise blade segments. For instance, the rotor blade 22 may be formed from three blade segments or more than three blade segments, such as four blade segments, five blade segments, or more than five blade segments.

In general, each blade segment 24, 26 may include an outer shell 38, 40 configured to extend between the opposed ends of such segment that generally serves as the outer casing/covering of the blade segment 24, 26. For instance, the root segment 24 may include a first outer shell 38 (FIG. 3) extending lengthwise between the root end 28 and the first joint end 32. Similarly, the tip segment 26 may include a second outer shell 40 (FIG. 3) extending lengthwise between the second joint end 34 and the tip end 30. Each of the outer shells 38, 40 may generally be configured to define spanwise sections of the aerodynamic profile of the rotor blade 22. As such, the outer shells 38, 40 may collectively define a pressure side 42 and a suction side 44 of the rotor blade 22, with the pressure and suction sides 42, 44 extending between leading and trailing edges 46, 48 of the rotor blade 22.

As shown in FIG. 2, when assembled, the rotor blade 22 may also have a span 50 defining the total length between its root and tip ends 28, 30, with the span 50 generally corresponding to the summation of the combined spanwise lengths of the blade segments 24, 26. For example, the root segment 24 may define a first spanwise length 52 (FIG. 3) and the tip segment 26 may define a second spanwise length 54 (FIG. 3). In addition, the rotor blade 22 may define a chord 56 (FIG. 2) corresponding to the total length of the blade between its leading and trailing edges 46, 48. As is generally understood, the chord 56 may generally vary in length with respect to the span 50 as the rotor blade 22 extends from the its root end 28 to its tip end 30.

It should be appreciated that, in several embodiments, the outer shells 38, 40 of the blade segments 24, 26 may be formed from one or more shell components. For instance, in one embodiment, each outer shell 38, 40 may be formed form a pressure side shell (not shown) forming a portion of the pressure side 42 of the rotor blade 22 and a suction side shell (not shown) forming a portion of the suction side 44 of the rotor blade 22. In addition, the outer shells 38, 40 may generally be formed from any suitable material. For instance, in several embodiments, each outer shell 38, 40 may be formed from a fiber-reinforced composite, such as a fiber reinforced laminate including a plurality of fibers (e.g., glass or carbon fibers) surrounded by a suitable matrix material (e.g., a thermoset resin material or a thermoplastic resin material). In addition, one or more portions of each outer shell 38, 40 may be configured as a layered construction and may include a core material, formed from a lightweight material such as wood (e.g., balsa), foam (e.g., extruded polystyrene foam) or a combination of such materials, disposed between layers of laminate composite material.

Additionally, in several embodiments, each blade segment 24, 26 may also include one or more internal structural components contained within its outer shell 38, 40 that is configured to provide increased stiffness, buckling resistance and/or strength to the rotor blade 22. For example, as shown in FIGS. 2 and 3, the root segment 24 may include one or more internal structural components 58 extending within the first outer shell 38, such as by including one or more longitudinally extending structural components (e.g., a pair of opposed spar caps having a shear web extending therebetween) positioned within the first outer shell 38. Similarly, as shown in FIGS. 2 and 3, the tip segment 26 may include one or more internal structural components 60 extending within the second outer shell 40, such as by including one or more longitudinally extending structural components (e.g., a pair of opposed spar caps having a shear web extending therebetween) positioned within the second outer shell 40.

Additionally, in accordance with aspects of the present subject matter, each blade segment 24, 26 may include one or more balance boxes 62, 64 installed within its interior. Specifically, as shown, the root segment 24 may include a root balance box 62 while the tip segment 26 may include a tip balance box 64. Each balance box 62, 64 may generally correspond to an internal storage compartment or enclosed volume within each blade segment 24, 26 that provides a location for adding mass to the blade segment 24, 26. For instance, as will be described below, mass (e.g., a mixture of sand and resin) may be added to the balance box installed within root segment 24 and/or the tip segment 26 to adjust the static moment associated with the corresponding blade segment(s) 24, 26.

It should be appreciated that, in general, each balance box 62, 64 may be installed within its corresponding blade segment 24, 26 at any suitable location along the segment's spanwise length 52, 54. However, in a particular embodiment of the present subject matter, each balance box 62, 64 may be positioned closer to the joint end 32, 34 of its corresponding blade segment 24, 26 than the opposed end of the blade segment 24, 26. For instance, each balance box 62, 64 may be located a distance 66 (FIG. 3) (e.g., as measured from the center of each box 62, 64) away from the joint end 32, 34 of its corresponding blade segment 24, 26 that is equal to less than 25% of the total spanwise length 52, 54 of such corresponding blade segment 24, 25, such as less than 20% of the total spanwise length 52, 54, or less than 10% of the total spanwise length 52, 54 or less than 5% of the total spanwise length 52, 54 and/or any other subranges therebetween.

Figure 4:
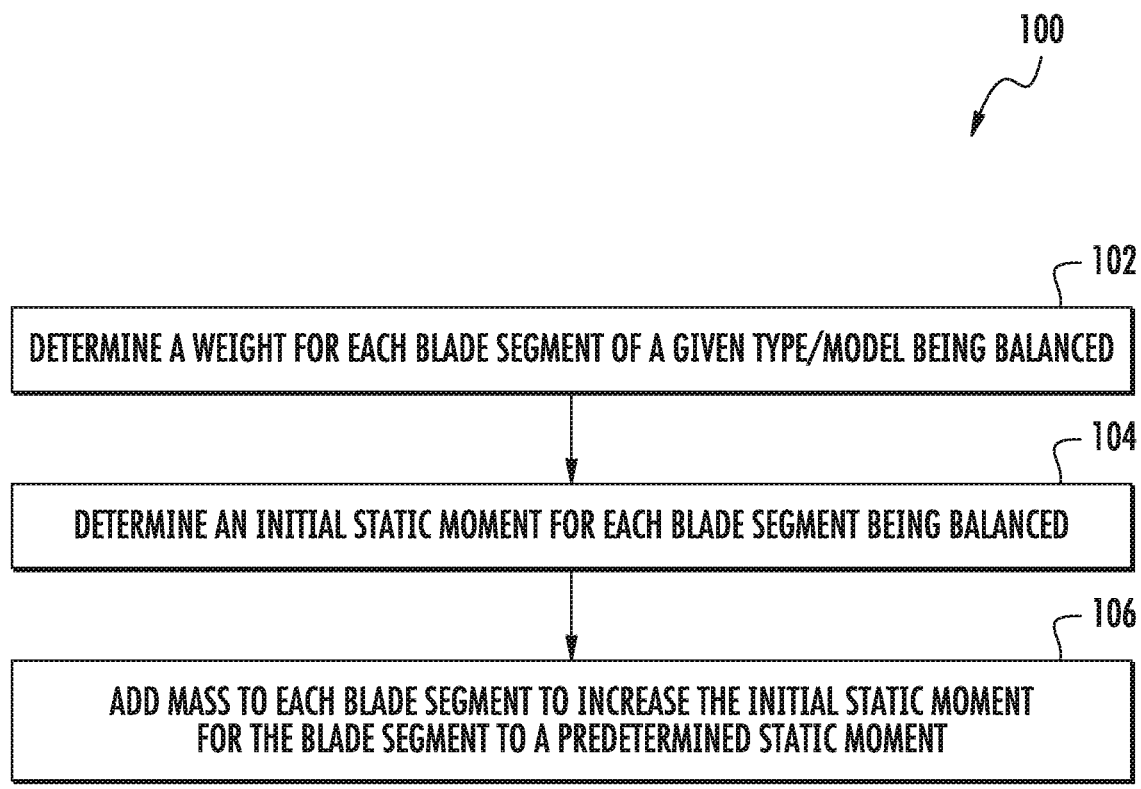
FIG. 4 illustrates a flow diagram of one embodiment of a method for balancing segmented rotor blades of a wind turbine in accordance with aspects of the present subject matter.

Referring now to FIG. 4, a flow diagram of one embodiment of a method 100 for balancing segmented rotor blades of a wind turbine is illustrated in accordance with aspects of the present subject matter. In general, the method 100 will be described herein with reference to balancing the blade segments used to form two-piece rotor blades, such as the rotor blade 22 described above with reference to FIGS. 2 and 3. However, in other embodiments, the method 100 may be used to provide balanced rotor blades formed from any other suitable number of blade segments, such as three or more blade segments.

It should also be appreciated that the disclosed method 100 may be applied to balance a complete set of segmented rotor blades for use with a wind turbine. Thus, for example, with reference to the embodiment described above with reference to FIGS. 2 and 3, the complete set of segmented rotor blades 22 may include a set of three root segments 24 and a set of three tip segments 26. To illustrate balancing the blade segments 24, 26 for such a set of rotor blades 22, the method 100 shown in FIG. 4 will be described particularly with reference to FIG. 5, which illustrates a set of three tip segments 26, namely a first tip segment 26A, a second tip segment 26B, and a third segment 26C. However, it should be appreciated that the method 100 described herein may be similarly applied to a set of a root segments 24.

As shown in FIG. 4, at (102), the method 100 may include determining a weight for each blade segment of a given type/model being balanced (e.g., each tip segment 26 of a given configuration or each root segment 24 of a given configuration). In general, the weight for each blade segment may be determined using any suitable means and/or methodology for weighing or otherwise calculating the weight of blade segments. For instance, in one embodiment, a scale or any other suitable weighing device may be used to determine the weight of each blade segment. Alternatively, the weight for each blade segment may be determined mathematically, such as by calculating the weight based on the dimensions of each blade segment and the properties of the material(s) used to form each blade segment.

Figure 5:
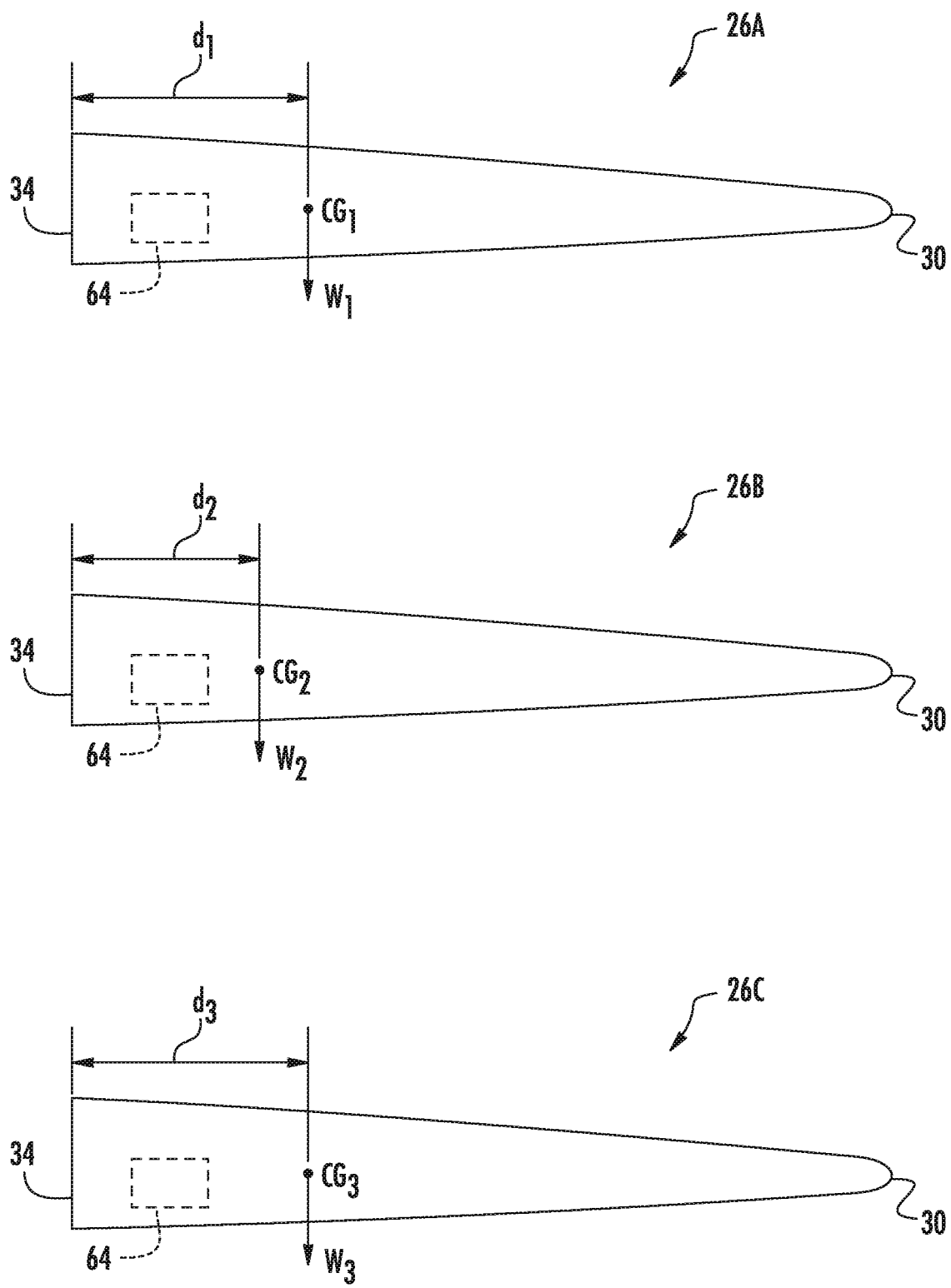
FIG. 5 illustrates a simplified view of a set of tip segments suitable for use within segmented rotor blades, particularly identifying various parameters that may be used to determine the static moment of each tip segment.

As particularly shown in the embodiment of FIG. 5, each of the tip segments 26A, 26B, 26C may be weighed or otherwise analyzed to determine its weight. For instance, the first tip segment 26A may have a first weight ($W_1$), the second tip segment 26B may have a second weight ($W_2$), and the third tip segment 26C may have a third weight ($W_3$). In one embodiment, the weight of at least one of the tip segments 26A, 26B, 26C may differ from the weights of the remainder of the tip segments. For instance, in a particular embodiment, each tip segment 26A, 26B, 26C may have a weight that differs from the weight of the other tip segments 26A, 26B, 26C at least slightly due to manufacturing tolerances and/or other limitations.

As is generally understood, the average location of the weight of each tip segment 26A, 26B, 26C may be represented by a center of gravity. For instance, as shown in FIG. 5, the first tip segment 26A may define a first center of gravity ($CG_1$), the second tip segment 26B may define a second center of gravity ($CG_2$), and the third tip segment 26C may define a third center of gravity ($CG_3$). In one embodiment, the location of the center of gravity of at least one of the tip segments 26A, 26B, 26C may differ from the locations of the centers of gravity of the remainder of the tip segments. For instance, in a particular embodiment, each tip segment 26A, 26B, 26C may have a center of gravity that is defined at a different location than the centers of gravity of the other tip segments due to manufacturing tolerances and/or other limitations.

Referring back to FIG. 4, at (104), the method 100 may include determining an initial static moment for each blade segment being balanced. As is generally understood, the static moment for a given blade segment may be determined as a function of its weight and the location of its center of gravity relative to a fixed reference point. For instance, the static moment may be calculated using the following equation (Equation 1):

$$SM = W * D_{cg} \qquad (1)$$

wherein, SM corresponds to the static moment for the blade segment, W corresponds to the weight of the blade segment, and $D_{cg}$ corresponds to the distance defined between the center of gravity for the blade segment and a fixed reference point defined on the blade segment (e.g., one of the ends of the blade segment).

For instance, using the example shown in FIG. 5, the static moment for each tip segment 26A, 26B, 26C may be calculated based on the determined weight of each tip segment 26A, 26B, 26C and the distance defines between each tip segment's center of gravity and a fixed reference point (e.g., the joint end 34 of each tip segment 26A, 26B, 26C). Specifically, the first tip segment 26A may define a first distance ($d_1$) between its joint end 34 and center of gravity ($CG_1$), the second tip segment 26B may define a second distance ($d_2$) between its joint end 34 and center of gravity ($CG_2$), and the third tip segment 26C may define a third distance ($d_3$) between its joint end 34 and center of gravity ($CG_3$). Thus, the initial static moment of the first tip segment 26A may be calculated by multiplying its weight ($W_1$) by the first distance ($d_1$). Similarly, the initial static moment of the second tip segment 26B may be calculated by multiplying its weight ($W_2$) by the second distance ($d_2$) while the initial static moment of the third tip segment 26C may be calculated by multiplying its weight ($W_3$) by the third distance ($d_3$). In one embodiment, the initial static moment of at least one of the tip segments 26A, 26B, 26C may differ from the initial static moments of the remainder of the tip segments. For instance, in a particular embodiment, each tip segment 26A, 26B, 26C may have an initial static moment that differs from the initial static moments of the other tip segments at least slightly due to manufacturing tolerances and/or other limitations.

Referring again back to FIG. 4, at (106), the method 100 may include adding mass to each of the plurality of blade segments to increase the initial static moment for each blade segment to a predetermined static moment. Specifically, as indicated above, each blade segment may include a balance box 62, 64 within which mass may be added to adjust the static moment of the blade segment. For instance, in one embodiment, a mixture of resin and sand may be used to create a thick slurry of material to be added within the balance box 62, 64 of each blade segment. Alternatively, any other suitable material(s) may be placed within the balance box 62, 64 of each blade segment to increase its mass and, thus, its corresponding static moment.

It should be appreciated that, in other embodiments, mass may be added to each of the blade segments without requiring the use of a balance box. For instance, in one embodiment, additional material(s) (e.g., resins, adhesives, weights, etc.) may simply be positioned within the interior of each blade segment at any suitable location to increase its mass, such as by coupling the additional material(s) to an interior surface or wall of the blade segment.

Additionally, it should be appreciated that, in the several embodiments, the predetermined static moment may correspond to a static moment that is greater than the initial static moment of each of the blade segments being balanced of a given type/model (e.g., a predetermined tip static moment that is greater than the initial static moment of each of the tip segments 26 being balanced and/or a predetermined root static moment that is greater than the initial static moment of each of the root segments 24 being balanced). As such, each blade segment being balanced may require that mass be added to its balance box (or at any other suitable location(s)) to allow the initial static moment of the blade segment to be increased to the predetermined static moment. In one embodiment, the predetermined static moment may be selected so as to correspond to a static moment that is greater than a maximum static moment allowed for a blade segment of a given type/model based on manufacturing tolerances and/or other limitations. For instance, based on allowable manufacturing variations, it may be determined that all or statistically all (e.g., 99.9%) of a given type/model of blade segment (e.g., a tip segment 26 or root segment 24) will have an initial static moment that is less than a given maximum static moment. In such instance, the predetermined static moment may be set as the maximum static moment for such type/model of blade segment or the predetermined static moment may be set as a static moment that is greater than the maximum static moment (e.g., 1%-5% greater than the maximum static moment).

By increasing the static moment of each of the blade segments being balanced to a common or predetermined static moment, the blade segments may be interchangeable with one another when assembling such blade segments with other blade segments to form a complete segmented rotor blade. A such, the blade segments may be used to a form a balanced rotor set without the need for re-weighing or re-balancing the segments in the field and/or without requiring the blade segments to be specifically matched with other corresponding blade segments.

For instance, in the embodiment shown in FIG. 5, mass may be added to the balance box 64 of each of the tip segments 26A, 26B, 26C to increase the initial static moment of each tip segment to a predetermined tip static moment. As indicated above, in one embodiment, the initial static moments of the tip segments 26A, 26B, 26C may vary from segment-to-segment. Thus, a different amount of mass may need to be added to each tip segment 26A, 26B, 26C to increase its static moment to the predetermined tip static moment. Once the static moment of each tip segment 26A, 26B, 26C has been increased to the predetermined tip static moment, the tip segments may form a uniform set of tip segments that may be paired with corresponding root segments to form a balanced rotor set.

Figure 6:
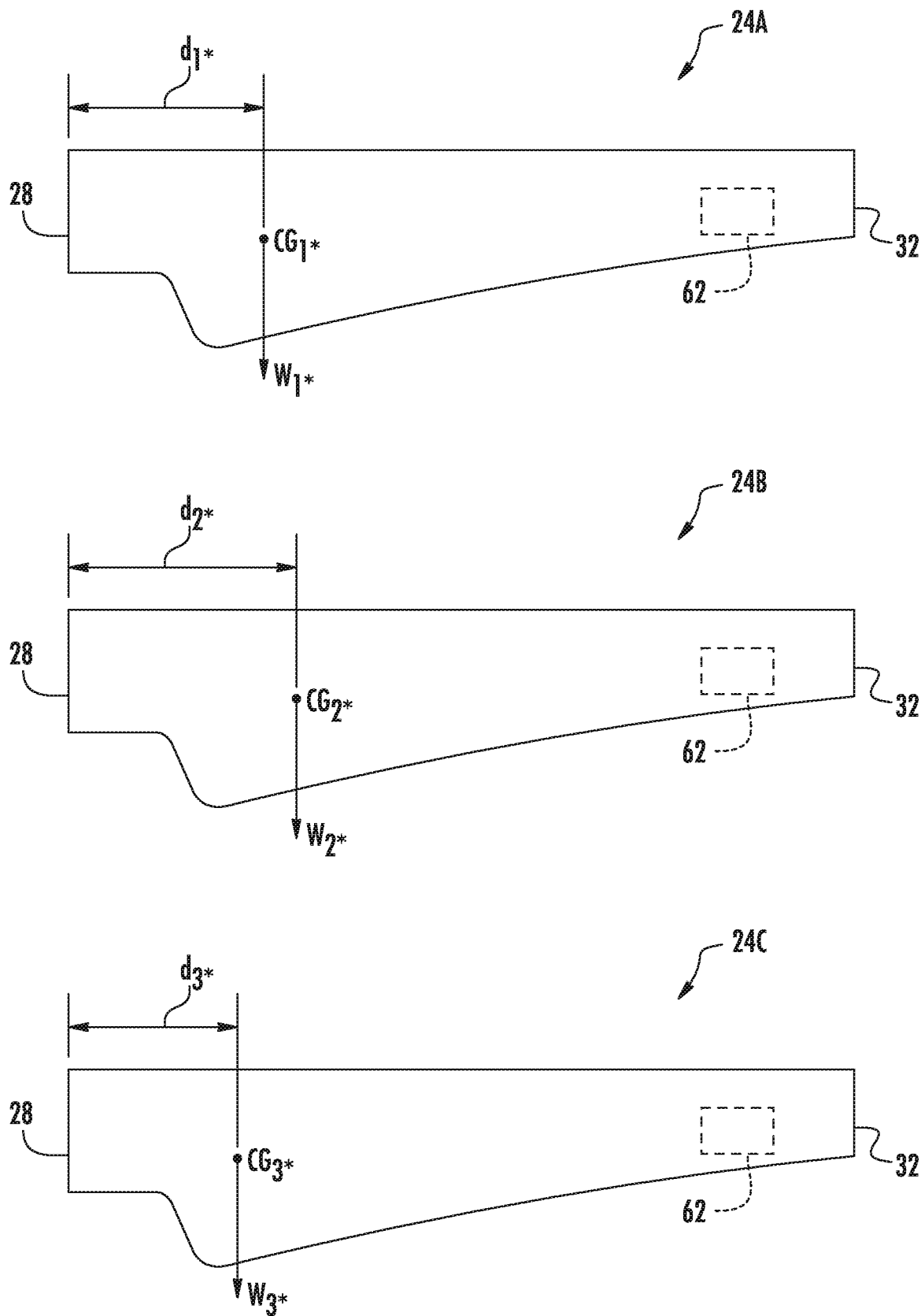
FIG. 6 illustrates a simplified view of a set of root segments suitable for use within segmented rotor blades, particularly identifying various parameters that may be used to determine the static moment of each root segment.

As indicated above, it should be appreciated that the method 100 described with reference to FIG. 4 may be similarly applied to root segments 24. For instance, FIG. 6 illustrates a set of three root segments, namely a first root segment 24A, a second root segment 24B, and a third root segment 24C. As shown, the first root segment 24A has a first weight ($W_{1*}$) and defines a first distance ($d_{1*}$) between its root end 28 and center of gravity ($CG_{1*}$). Similarly, the second root segment 24B has a second weight ($W_{2*}$) and defines a second distance ($d_{2*}$) between its root end 28 and center of gravity ($CG_{2*}$). Additionally, the third root segment 24C has a third weight ($W_{3*}$) and defines a third distance ($d_{3*}$) between its root end 28 and center of gravity ($CG_{3*}$). In such an embodiment, the method 100 may be applied by determining both the weight of each root segment 24A, 24B, 24C and its corresponding initial static moment (e.g., as a function of the weight and the distance defined between the center of gravity and the segment's root end 28). Thereafter, mass may be added to each of the root segments 24A, 24B, 24C to increase the initial static moment of each root segment to a predetermined root static moment that is greater than the largest initial static moment of the root segments 24A, 24B, 24C.

Given that root segments are typically provided with larger allowable manufacturing variance ranges than tip segments, it may be desirable, in alternative embodiments, to set the predetermined root static moment based on the maximum initial static moment of the specific set of root segments being balanced as opposed to a static moment that exceeds the initial static moments of each of the root segments. For instance, when balancing the set of three root segments 24A, 24B, 24C shown in FIG. 6, the weight and initial static moment of each root segment 24A, 24B, 24C may be determined. Thereafter, the root segment having the largest initial static moment may be identified, with its initial static moment being set as the predetermined root static moment for the remainder of the root segments. Mass may then be added to the other root segments to increase their initial static moments to the predetermined root static moment such that each root segment has the same static moment.

By balancing sets of three root segments 24A, 24B, 24C based on the largest initial static moment for the set, uniformly balanced root segments may be formed without unnecessarily increasing the weight of each root segment. Thereafter, each root segment 24A, 24B, 24C may be simply paired to a corresponding balanced tip segment (e.g., tip segments 26A, 26B, 26C) without the need to match the root segments to specific tip segments in attempt to create a balanced set of rotor blades for a given wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for balancing segmented rotor blades for a wind turbine, the method comprising:
   determining a weight for each of a plurality of blade segments, each blade segment of the plurality of blade segments extending between a first end and a second end and being configured to form a common spanwise section of a respective segmented rotor blade between the first and second ends;
   determining an initial static moment for each blade segment of the plurality of blade segments based on the weight of the blade segment, the initial static moment of at least one blade segment of the plurality of blade segments differing from the initial static moments of the remainder of the plurality of blade segments; and
   adding mass to each of the plurality of blade segments to increase the initial static moment for each blade segment of the plurality of blade segments to a predetermined static moment, the predetermined static moment being greater than each of the individual initial static moments of all of the plurality of blade segments.

2. The method of claim 1, wherein each blade segment of the plurality of blade segments corresponds to a tip segment, the first end corresponding to a joint end of the tip segment and the second end corresponding to a tip end of the tip segment, the joint end being configured to be coupled to a corresponding root segment of the respective segmented rotor blade.

3. The method of claim 1, wherein each blade segment of the plurality of blade segments corresponds to a root segment, the first end corresponding to a root end of the root segment and the second corresponding to a joint end of the root segment, the joint end being configured to be coupled to a corresponding tip segment of the respective segmented rotor blade.

4. The method of claim 1, further comprising determining a center of gravity for each blade segment of the plurality of blade segments, wherein determining the initial static moment for each blade segment of the plurality of blade segments comprises determining the initial static moment for each blade segment of the plurality of blade segments based on both the weight of the blade segment and a location of the center of gravity of the blade segment.

5. The method of claim 1, wherein adding mass to each of the plurality of blade segments comprises adding mass within a balance box installed within an interior of each of the plurality of blade segments.

6. The method of claim 1, wherein the first end of each of the plurality of blade segments corresponds to a joint end of each blade segment and each blade segment of the plurality of blade segments defines a spanwise length between the first and second ends; the balance box being located within the interior of each blade segment a distance from the joint end equal to less than 25% of the spanwise length.

7. The method of claim 1, wherein the predetermined static moment corresponds to a static moment that is equal to or greater than a maximum static moment for the plurality of blade segments based on allowable manufacturing variations.

8. The method of claim 1, wherein the initial static moment of each blade segment of the plurality of blade segments differs from the initial static moments of the remainder of the plurality of blade segments.

9. A method for balancing segmented rotor blades for a wind turbine, the method comprising:
   providing a plurality of tip segments and a plurality of root segments, each of the plurality of root segments having a predetermined root static moment and being configured to be coupled to a respective tip segment of the plurality of tip segments to form a respective segmented rotor blade;
   determining a weight of each of the plurality of tip segments;
   determining an initial tip static moment for each tip segment of the plurality of tip segments based on the weight of the tip segment, the initial tip static moment of at least one tip segment of the plurality of tip segments differing from the initial tip static moments of the remainder of the plurality of tip segments; and
   adding mass to each of the plurality of tip segments to increase the initial tip static moment for each tip segment of the plurality of tip segments to a predetermined tip static moment, the predetermined tip static moment being greater than each of the individual initial tip static moments of all of the plurality of tip segments.

10. The method of claim 9, further comprising:
    weighing each of the plurality of root segments;
    determining an initial root static moment for each root segment of the plurality of root segments based on the weight of the root segment, the initial root static moment of at least one root segment of the plurality of root segments differing from the initial root static moments of the remainder of the plurality of root segments; and
    selecting the predetermined root static moment as the highest initial root static moment of the plurality of root segments.

11. The method of claim 10, further comprising adding mass to each root segment of the plurality of root segments having an initial root static moment that is less than the predetermined root static moment to increase the initial root static moment for the root segment to the predetermined root static moment.

12. The method of claim 9, further comprising determining a center of gravity for each tip segment of the plurality of tip segments, wherein determining the initial tip static moment for each tip segment of the plurality of tip segments comprises determining the initial tip static moment for each tip segment of the plurality of tip segments based on both the weight of the tip segment and a location of the center of gravity of the tip segment.

13. The method of claim 9, wherein adding mass to each of the plurality, of tip segments comprises adding mass within a balance box installed within an interior of each of the plurality of tip segments.

14. The method of claim 9, wherein each tip segment of the plurality of tip segments extends lengthwise between a joint end and a tip end and defines a spanwise length between the joint and tip ends, the balance box being located within the interior of each tip segment of the plurality of tip segments a distance from the joint end equal to less than 25% of the spanwise length.

15. The method of claim 9, wherein the predetermined tip static moment corresponds to a static moment that is equal to or greater than a maximum static moment for the plurality of tip segments based on allowable manufacturing variations.

16. The method of claim 9, wherein the initial tip static moment of each tip segment of the plurality of tip segments differs from the initial tip static moments of the remainder of the plurality of tip segments.

17. The method of claim 9, further comprising pairing each tip segment of the plurality of tip segments with a respective root segment of the plurality of root segments.

* * * * *